United States Patent
Toutain et al.

(10) Patent No.: US 11,445,064 B2
(45) Date of Patent: Sep. 13, 2022

(54) METHOD FOR ESTABLISHING A COMMUNICATION WITH AN INTERACTIVE SERVER

(71) Applicant: ORANGE, Issy-les-Moulineaux (FR)

(72) Inventors: Francois Toutain, Chatillon (FR); Emmanuel Le Huerou, Chatillon (FR); Eric Beaufils, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 248 days.

(21) Appl. No.: 16/623,602

(22) PCT Filed: Jun. 12, 2018

(86) PCT No.: PCT/FR2018/051358
§ 371 (c)(1),
(2) Date: Dec. 17, 2019

(87) PCT Pub. No.: WO2018/234655
PCT Pub. Date: Dec. 27, 2018

(65) Prior Publication Data
US 2020/0396334 A1 Dec. 17, 2020

(30) Foreign Application Priority Data
Jun. 19, 2017 (FR) .................. 1755581

(51) Int. Cl.
*H04M 3/493* (2006.01)
*H04M 7/00* (2006.01)

(52) U.S. Cl.
CPC ....... *H04M 3/4938* (2013.01); *H04M 7/0042* (2013.01); *H04M 2203/2038* (2013.01); *H04M 2203/253* (2013.01)

(58) Field of Classification Search
CPC ............ H04M 3/4938; H04M 7/0042; H04M 2203/2038; H04M 2203/253; H04M 3/493
See application file for complete search history.

(56) References Cited

U.S. PATENT DOCUMENTS

| | | | |
|---|---|---|---|
| 8,417,649 B2* | 4/2013 | Hamilton, II | G06N 3/006 706/12 |
| 8,891,410 B2* | 11/2014 | Burg | H04M 3/567 379/900 |

(Continued)

FOREIGN PATENT DOCUMENTS

EP 1701527 A1 9/2006

OTHER PUBLICATIONS

English translation of the Written Opinion of the International Searching Authority dated Sep. 12, 2018 for corresponding International Application No. PCT/FR2018/051358, filed Jun. 12, 2018.

(Continued)

*Primary Examiner* — Lisa Hashem
(74) *Attorney, Agent, or Firm* — David D. Brush; Westman, Champlin & Koehler, P.A.

(57) ABSTRACT

A method for establishing a second communication according to a second modality on based on a first communication established according to a first modality between a communication terminal and an interactive server, the server reacting, according to a predefined logic, to commands received from the terminal, the logic being predefined by states and by conditions of transitions between the states. The method includes the server: obtaining a command for establishing a second communication according to a second modality; storing a context representative of interactions taken place between the terminal and the server in the course of the first communication in association with a public identity, the context including a state occupied by the server in the course (Continued)

Figures 1, 2:
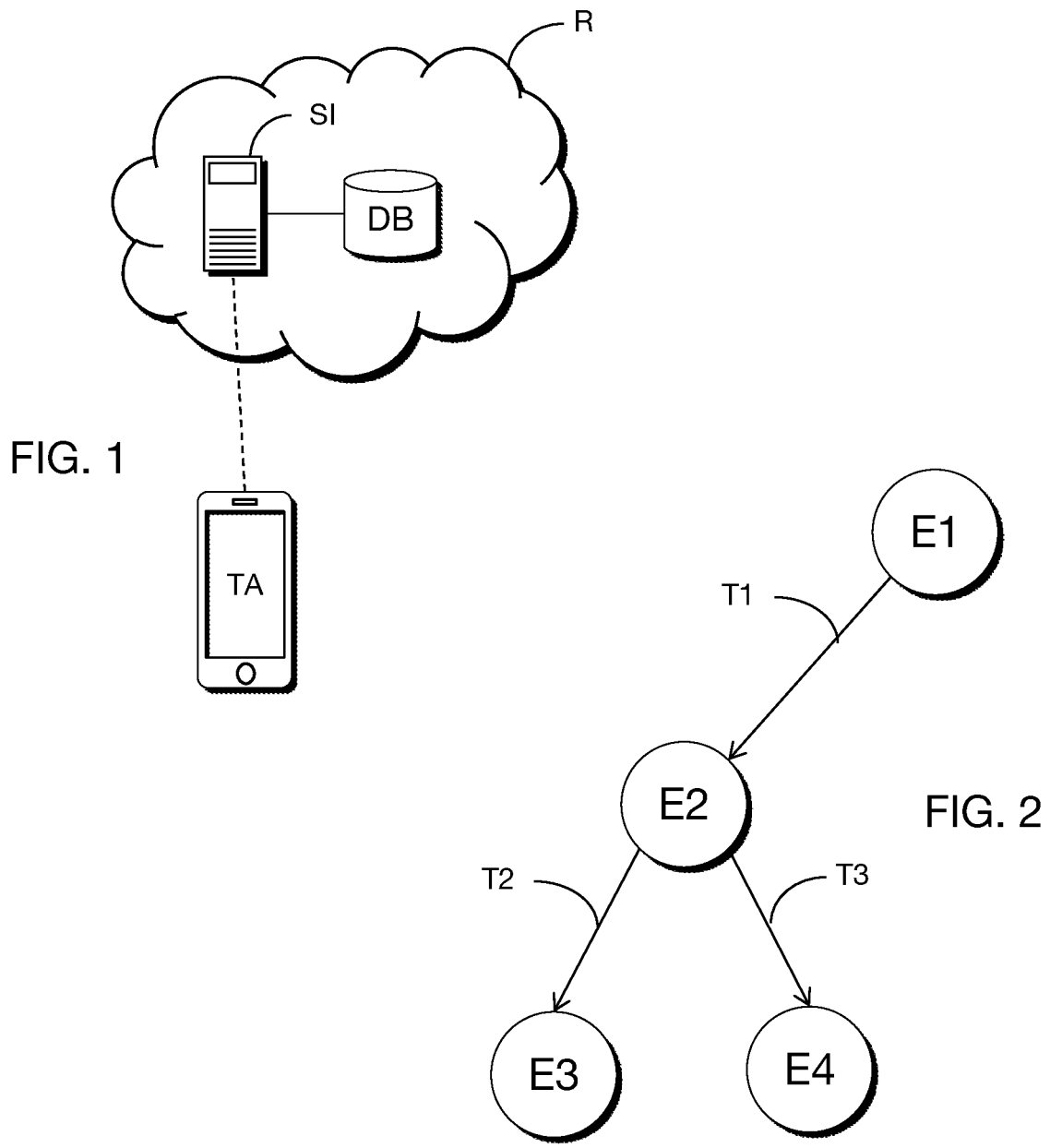

of the first communication; establishing the second communication according to the second modality toward a recipient terminal designated by the stored public identity; and configuring the second communication based on the stored context.

13 Claims, 3 Drawing Sheets

(56) References Cited

U.S. PATENT DOCUMENTS

| | | |
|---|---|---|
| 8,914,850 B1 | 12/2014 | Mateer et al. |
| 2003/0063728 A1 | 4/2003 | Sibal et al. |
| 2008/0147407 A1* | 6/2008 | Da Palma ............... G10L 15/22 704/E15.04 |
| 2009/0003576 A1* | 1/2009 | Singh .................. H04M 7/0045 379/202.01 |
| 2009/0049138 A1* | 2/2009 | Jones .................. G06Q 10/107 709/206 |
| 2014/0359138 A1* | 12/2014 | Charugundla .... H04M 3/42391 709/227 |
| 2015/0065186 A1* | 3/2015 | Mohd Mohdi ....... H04W 76/45 455/518 |
| 2016/0028891 A1* | 1/2016 | Pirat ................... H04M 3/5141 379/88.01 |
| 2017/0149844 A1* | 5/2017 | Pirat ................... H04L 65/1069 |
| 2017/0178630 A1* | 6/2017 | Gummadi ............. H04M 11/10 |
| 2017/0242886 A1* | 8/2017 | Jolley ................... G06F 40/205 |
| 2019/0245976 A1* | 8/2019 | George ............... H04M 3/5235 |

OTHER PUBLICATIONS

Handley et al., "SDP: Session Description Protocol", RFC 4566, Jul. 2006.
H. Schulzrinne et al., "RTP Payload for DTMF Digits, Telephony Tones, and Telephony Signals", RFC 4733, Dec. 2006.
International Search Report dated Sep. 4, 2018 for corresponding International Application No. PCT/FR2018/051358, filed Jun. 12, 2018.
Written Opinion of the International Searching Authority dated Sep. 4, 2018 for corresponding International Application No. PCT/FR2018/051358, filed Jun. 12, 2018.

* cited by examiner

US 11,445,064 B2

METHOD FOR ESTABLISHING A COMMUNICATION WITH AN INTERACTIVE SERVER

CROSS-REFERENCE TO RELATED APPLICATIONS

This Application is a Section 371 National Stage Application of International Application No. PCT/FR2018/051358, filed Jun. 12, 2018, which is incorporated by reference in its entirety and published as WO 2018/234655 A1 on Dec. 27, 2018, not in English.

TECHNICAL FIELD

The application for invention lies in the field of telecommunications and more particularly in the field of communications with an interactive server.

PRIOR ART

An interactive voice server (IVR in English, for Interactive Voice Response) is a computer server capable of establishing telephone communications with a caller and of executing certain actions according to commands dispatched by the calling terminal and according to a service logic for which it is programmed. In a conventional manner, an IVR can access databases and communicate information to a calling terminal by using for example a voice synthesis device. An IVR generally proposes a tree of rubrics amongst which a terminal can navigate by transmitting commands. The commands can be transmitted by DTMF (Dual-Tone Multi-Frequency) codes or by key words spoken by the user of the terminal.

The use of a voice server to obtain details is sometimes tedious. It may happen for example that a voice server asks the caller to input a client number composed for example of digits and of letters. It may be difficult to input such a code from a numeric keypad of a telephone. To alleviate this drawback, numerous IVRs prompt users to spell out the various constituent characters of the code. The server implements a voice recognition algorithm to determine the digits or the letters spoken. When the environment is noisy, doing this sometimes leads to erroneous recognition of the code by the voice server and the user may be required to spell out the code again.

Today we are witnessing the emergence of conversational agents capable of dialoguing with users by way of instant messaging. These conversational agents (ChatBot in English), are implemented by computer servers capable of interpreting natural language commands or phrases dispatched by a terminal and of reacting thereto by communicating information or by carrying out actions. Certain conversational agents are capable for example of responding to questions relating to the weather by providing forecasts according to questions asked by users. Just like an IVR, a Chatbot reacts to key words or phrases transmitted by instant messaging according to a service logic for which it is programmed.

Numerous companies make voice servers of IVR type available to their clients so as to reduce the costs engendered by a call center. These same companies sometimes make "virtual advisors" available to their clients which enable users to ask questions and to obtain details by dispatching instant messages to a particular address. A Chatbot overcomes the drawback of voice servers when characters such as a password or a client number for example are to be input, since an instant messaging interface is designed to be used with a keyboard making it possible to input characters of any sort.

Despite everything, written communication with a virtual assistant requires particular attention. It is tricky for example to dialog in writing with a conversational agent while walking along the street, whereas voice consultation of an IVR can be done easily while walking.

A user must therefore choose the modality through which he will communicate with an automated client service of a company as a function of the information that he will have to communicate and of the context in which he communicates. It may often happen that the context in which a user accesses such a service does not allow him to contact it. It may also happen that the context in which the user is operating varies over time for one and the same service.

A need therefore exists for a user to be able to communicate with a remote consultation service in a comfortable manner and in a way which is adapted to suit the context in which the user accesses the service.

A solution is proposed to improve the situation.

SUMMARY OF THE INVENTION

To this effect, there is proposed a method for establishing a second communication according to a second modality on the basis of a first communication established according to a first modality between a communication terminal and an interactive server, the interactive server being adapted to react, according to a predefined logic, to commands received originating from the terminal, the logic being predefined by a set of states and by conditions of transitions between said states, the method comprising the following steps carried out by the server:
  obtaining a command for establishing a second communication according to a second modality,
  storing a context representative of the interactions that have taken place between the terminal and the interactive server in the course of the first communication in association with a public identity, the context comprising at least one state occupied by the interactive server in the course of the first communication,
  establishing a second communication according to a second modality toward a recipient terminal designated by the stored public identity, and
  configuring the second communication on the basis of the stored context.

The behavior of the interactive server is defined by a finite number of states and by the transitions which allow the passage from one state to another. It implements for example a finite automaton able to be in a finite number of states, a single state at a time. The state which the automaton is in is called the "current state". The passage from one state to another is conditioned by an event such as for example the receipt of a message originating from a terminal, or the detection of an event relating to a service requested by the terminal. This change of state is called a "transition". A particular automaton is defined by the set of its states and by the conditions of the transitions.

Such an automaton is for example defined by a description in the VoiceXML format standardized by the VoiceXML Forum and recognized by the W3C. An exemplary description in the VoiceXML format is annexed hereto.

A first communication is established between an interactive server and a terminal. The terminal can command the interactive server by dispatching commands. The commands can be DTMF (Dual tone Multi Frequency) codes transmitted in messages complying with the modality of the communication. The commands can also be dispatched in the form of key words spoken by the user and transmitted in the form of a coded audio signal, or else key words transmitted in text form, according to the modality of the communication.

The receipt of such commands causes changes of state of the automaton governing the behavior of the server. The server's responses to the commands received are transmitted to the terminal according to a format adapted to suit the modality of the communication. For example, in the case of a voice communication, the server transmits a synthesized or prerecorded speech signal adapted so as to be rendered by a loudspeaker of the terminal.

On receipt of a particular command, the interactive server stores a context comprising for example at least the current state of the automaton which governs its behavior, as well as a public identity. A public identity is an address which makes it possible to contact a terminal or a set of terminals associated with this identity. The public identity is for example the telephone number, a contact address or an SIP (Session Initiation Protocol) address of the terminal with which the first communication is established. The public identity can also be associated with another terminal of the user, or be shared by a plurality of terminals. The context can also comprise other data, such as for example the data which were transmitted by the terminal in response to requests sent by the server. For example, the context can comprise a client number or a telephone number transmitted by the terminal in the course of the conversation.

The stored context thus comprises the data necessary to configure the automaton in the state in which it was at the moment of storage.

The server thereafter establishes a communication with the terminal designated by the public identity stored according to a second modality and uses the stored context to configure the new communication.

In this way, the method allows the establishment of a new communication according to a different modality from the first communication. The new communication is configured with the stored context data. In this way, the user of the terminal can continue the interaction begun with the interactive server by using the new modality. The user of the terminal is not compelled to resume the interaction from the initial state of the automaton. The terminal with which the second communication is established can be the terminal with which the first communication is established.

Thus, it is possible for a user to change the modality of a communication with an interactive service without losing the context thereof.

According to a particular embodiment, the configuring step comprises a step of transmitting to the recipient terminal, via the second communication and in a form adapted to suit the second modality, at least a part of the stored context.

In this way, the user of the recipient terminal is informed via the second communication and according to a second modality, of the state which the interactive server is in when he continues the interaction from an interface adapted to suit the second modality. For example, the server can transmit via the second communication the last message transmitted via the first communication. Thus, the user can easily continue the interaction by using the communication established according to the second modality, this datum allowing for example the terminal to render a context item of information representative of the exchanges that have taken place on the first communication. For example, the recipient terminal can display the last message transmitted by the server on the first communication.

According to a particular embodiment, the method is such that the stored context comprises at least a history of the states successively occupied by the interactive server in the course of the first communication and a history of the transitions that led to these states.

The context comprises the history of the successive states of the automaton governing the behavior of the server, and/or of the transitions that have caused these changes of state. The server can transmit this context to the recipient terminal of the second communication. The terminal is then capable of rendering on an interface associated with the second communication, the history of the states since the beginning of the first communication. Such an arrangement allows for example the terminal receiving a message comprising the stored context to render the history of a navigation of the user within the tree of the interactive server.

According to a particular embodiment, the first communication is established according to a voice modality, the second communication being established according to a text modality.

The first communication is established according to a voice modality. It entails for example a telephone call to a voice interactive server. When the server determines that the establishment of a second communication is desirable, for example on receipt of a particular command originating from the terminal, a second communication according to a text modality is established toward the terminal designated by the stored public identity. For example, the second communication is an instant messaging communication complying with the RCS (Rich Communication suite) standard. The server can thus dispatch a summary text message recapping the various choices performed by the user in the course of the first communication. The message can then be displayed in the RCS communication interface of the terminal to advise the user about the state of the interactive server, the possible commands expected and the choices made by the user in the course of the voice communication.

According to a particular embodiment, the method comprises a step of adapting the context to the modality of the second communication. For example, the stored context data are transformed into a text message comprehensible to a human and adapted to be displayed in an instant messaging interface.

According to a particular embodiment, the method is such that the first communication is established according to a text modality, the second communication being established according to a voice modality.

A communication is initially established according to a text modality. It entails for example a communication established according to an instant messaging protocol such as RCS with an interactive server adapted to exchange text messages, such as for example a chatbot.

A communication established according to a text modality makes it possible for example to exchange written messages such as instant messages or SMSs. Such messages can furthermore contain non-textual contents, such as images, elements for formatting text or user interfaces.

A communication established according to a voice modality allows the exchange of compressed audio streams between the opposite parties. It entails for example a conventional bidirectional telephone communication or a communication established in compliance with an instant messaging protocol. Such a communication allows the exchange of commands in the form of "inband" DTMF, that is to say transmitted in the form of an audio signal, or "outband"

DTMF, that is to say transmitted in the signaling for example. IETF standard RFC 4733 defines for example a format for the "outband" DTMFs.

The second communication established when the server determines that the establishment of a second communication is desirable, for example through the receipt of a command originating from the terminal subsequent to the receipt of a command originating from the terminal is a voice communication. The server can establish such a second communication on the basis of the stored public identity. The public identity is for example communicated by the call signaling exchanged during the establishment of the first communication or transmitted by the terminal by a dedicated message.

The stored context is transmitted to the terminal via the voice communication. Accordingly, the server can generate a synthesis speech signal which vocally summarizes the interactions that have taken place between the terminal and the server in the course of the first communication established according to a text modality.

In this way, the user of the terminal knows the state of the service when he continues the communication according to the voice modality.

The user of a terminal can thus toggle from a text modality to a voice modality, or vice versa, according to the context in which he is communicating and according to the data requested by the server.

According to a particular embodiment, the method comprises a step of checking that a communication according to a second modality is possible between the server and the recipient terminal.

In this way, the method allows the establishment of the second communication solely if the terminal supports the modality in which it must be established.

Accordingly, the server can dispatch to the terminal designated by the stored public identity a message making it possible to obtain in return the communication capabilities of the terminal. The capabilities can also be received by the server at the moment of establishment of the first communication. In this way the server does not attempt to establish a communication according to a modality not supported by the recipient terminal.

According to a particular embodiment, the method is such that the first communication is maintained subsequent to the establishment of the second communication, and that the messages sent by the server are transmitted via the first and the second communication.

The first and second communications are active simultaneously and the messages transmitted on one communication are also transmitted on the other communication. In this way, the user can use either of the communications to interact with the service, pass from one communication to the other, the voice messages transmitted by the server on a voice communication also being transmitted in a suitable form on the text communication.

According to a particular embodiment, the second communication is established with a recipient terminal distinct from the terminal with which the first communication is established.

When the stored public identity is different from the public identity associated with the terminal with which the first communication is established, or else when the stored public identity is shared by a plurality of terminals, the second communication can be established with a distinct recipient terminal. The user of the interactive service can then select a terminal particularly adapted to suit the modality of the second communication.

According to another aspect, and in a corresponding manner to the establishing method, there is proposed a method for toggling from a first communication established according to a first modality with an interactive server to a second communication established according to a second modality with the interactive server, the interactive server being adapted to react according to a predefined logic to commands sent by the terminal, the method comprising the following steps carried out by the terminal:
    dispatching to the server of a command for toggling to a second communication according to a second modality,
    receiving a message of establishment of a second communication between the interactive server and the terminal according to a second modality,
    receiving at least one message representative of the interactions that have taken place between the terminal and the interactive server during the first communication, and
    rendering of the representative message received.

The user of a terminal can thus ask for a new communication to be established according to a new modality. The context of the interaction with the interactive server is preserved from one communication to the other. In this way, a user of the terminal can choose to use the modality most suited to the conditions in which he accesses the service. The toggling command can furthermore comprise a public identity to which to carry out the toggling. The terminal receives and renders in a suitable interface a message comprising data representative of the interactions that have taken place with the server. In this way, the context of the first communication is preserved in the second communication.

According to yet another aspect, there is proposed a device for establishing a second communication according to a second modality on the basis of a first communication established according to a first modality between a communication terminal and the device, the device being adapted to react, according to a predefined logic, to commands received originating from the terminal, the logic being predefined by a set of states and by conditions of transitions between said states, the device being characterized in that it comprises:
    a communication module adapted to obtain a command for establishing a second communication according to a second modality,
    a memory adapted to store a context representative of the interactions that have taken place between the terminal and the device in the course of the first communication in association with a public identity, the context comprising at least one state occupied by the device in the course of the first communication,
    a communication module adapted to establish a second communication according to a second modality with a recipient terminal designated by the stored public identity, and
    a configuration module adapted to configure the second communication on the basis of the stored context.

There is also proposed a device for toggling between a first communication established according to a first modality with an interactive server and a second communication established according to a second modality with the interactive server, the interactive server being adapted to react according to a predefined logic to commands sent by the device, the device comprising:
    a communication module adapted to transmit destined for the interactive server a command for establishing a second communication according to a second modality, the communication module also being adapted to receive a message of establishment of a second communication between the interactive server and the device according to a second modality, and he communication module furthermore being adapted to receive at least one message comprising a context representative of the interactions that have taken place between the device and the interactive server in the course of the first communication.

The invention also relates to an interactive server comprising an establishing device such as described hereinabove.

The invention also relates to a terminal comprising a toggling device such as described hereinabove.

The invention also relates to a computer program comprising the instructions for the execution of the method such as described hereinabove for establishing a second communication, when the program is executed by a processor and/or the instructions for the execution of the toggling method.

Finally, the invention pertains to an information medium readable by a processor on which is recorded a computer program comprising instructions for the execution of the steps of the method such as described hereinabove for establishing a second communication and/or the instructions for the execution of the toggling method.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk. Moreover, the information medium can be a transmissible medium such as an electrical or optical signal, which can be conveyed via an electrical or optical cable, by radio or by other means. The program according to the invention can be in particular downloaded over a network of Internet type. Alternatively, the information medium can be an integrated circuit in which the program is incorporated, the circuit being adapted to execute or to be used in the execution of the method in question.

The various aforementioned embodiments or characteristics can be added independently or in combination with one another, to the steps of the method such as is defined hereinabove.

The terminals, servers, devices, programs and information mediums exhibit at least advantages analogous to those conferred by the methods to which they pertain and described hereinabove.

LIST OF FIGURES

Figure 3:
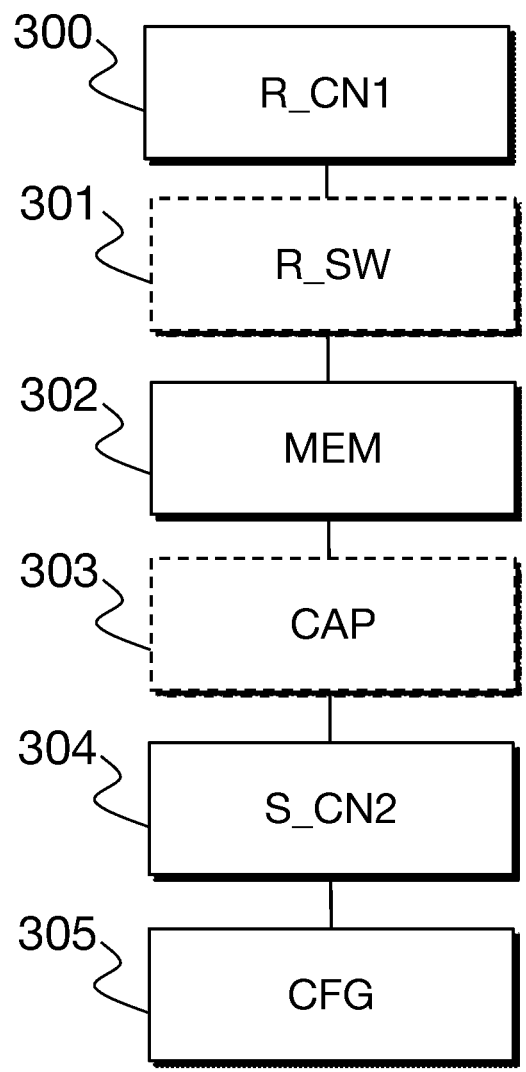
Figure 4:
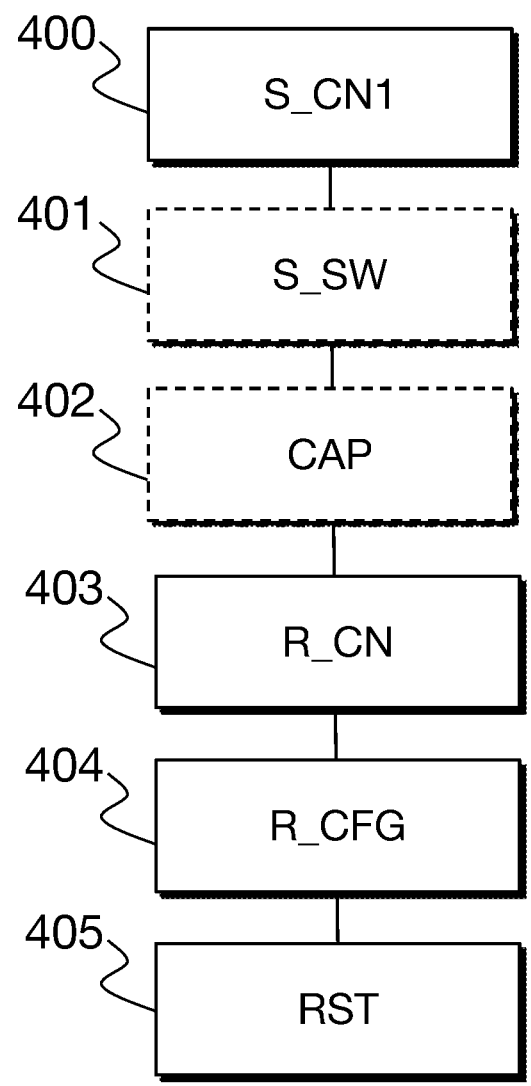
Figure 5:
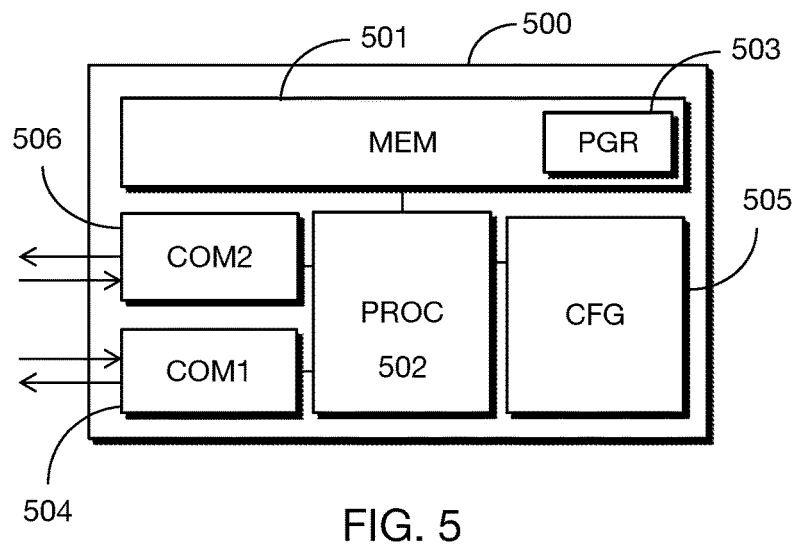
Figure 6:
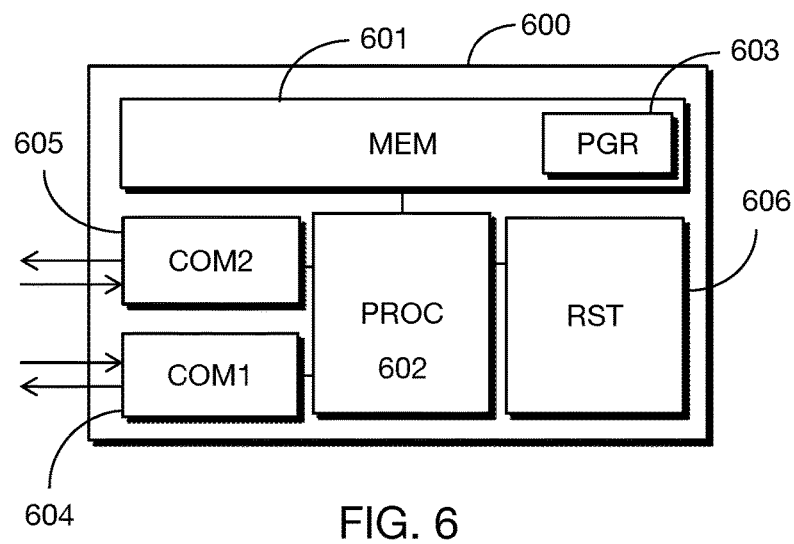

Other characteristics and advantages will become apparent on reading preferred embodiments described with reference to the figures among which:

FIG. 1 illustrates a communication network comprising an interactive server accessible from a terminal, FIG. 2 represents the states and the transitions of a finite automaton, FIG. 3 illustrates the main steps of the establishing method, FIG. 4 illustrates the main steps of the toggling method, FIGS. 5 and 6 represent architectures of devices respectively adapted for the implementation of the establishing and toggling methods.

DETAILED DESCRIPTION

FIG. 1 illustrates the architecture of a communication network adapted for the implementation of the methods for establishing a second communication and for toggling.

The figure represents a network R comprising an interactive server SI. The network R is a communication network, for example of IMS type, and allows the establishment of communications between terminals and interactive servers. In particular, the network R allows the establishment of communications according to various modalities between the terminal TA and the server SI. Thus, voice, video or else text communications can be established between the server SI and the terminal TA.

The invention is not limited to the framework of IMS networks. The communication network R can be a GSM (Global System for Mobile communication) telecommunication network allowing the establishment of voice communications and the exchanging of text messages by way of SMS (Short Message Service) for example.

The network R can also correspond to several distinct and interconnected networks from which the server SI is accessible. For example, the terminal TA can establish voice communications by way of a switched fixed network or a cellular network and text communications via a WiFi, 2G, 3G or 4G access network.

The interactive server SI is in this example a voice interactive server (IVR for Interactive Voice Response in English). The interactive server SI can in particular accept telephone calls originating from the terminal TA and respond to its requests by interrogating for example a database DB. The requests are transmitted by the terminal in the form of DTMF signals or by key words spoken by the user and interpreted by the server subsequent to speech recognition.

The server SI is configured to respond to the requests of the terminal TA according to a predefined service logic. Such a service logic can be defined by a configuration file in the VoiceXML format. VoiceXML configuration makes it possible to define scenarios of interactions between a terminal and a voice interactive server. An exemplary description file is annexed hereto.

The <form> tag makes it possible here to configure the interactive server so that it asks the terminal to provide it with a client number. A message inviting the user of the terminal to input a telephone number is defined by the <prompt> tag. The <form> field also comprises a <grammar> tag containing a link to a description file of the format expected for the telephone number. This grammar is used by the server to verify the validity of the item of information provided by the terminal in response to the invitation to provide a telephone number. Finally, the <form> tag comprises a <goto> tag making it possible to designate a section of the description to be executed when the number has been provided successfully. In this instance, when the terminal has provided a correct client number complying with the grammar, the <menu> section is executed. This section is a menu from which the user can select various choices proposed by the server. An invitation to make a choice from among a proposal list is defined by the <prompt> tag. The various possible choices are given by the <choice> tags. Depending on the choice made, execution will continue according to description files designated by the "next" attribute of the <choice> tag.

Such a description can be implemented in the server SI by a finite automaton. FIG. 2 illustrates the states and the transitions of such an automaton configured according to the VoiceXML description file annexed hereto.

The state E1 corresponds for example to the <form> tag identified by the "getClientNumber" attribute of the VoiceXML configuration file. In this state, the terminal expects the user to provide a client number whose format complies with the grammar designated by the <grammar> tag.

The receipt of a valid client number causes a transition T1 from the state E1 to the state E2. An invalid number does not allow the transition to the state E2.

The state E2 corresponds to the <menu> tag identified by the "selectService" attribute of the VoiceXML configuration file. In this state, the terminal expects the user to make a choice from among the proposed choices.

The receipt of a message corresponding to the choice "Service 1" by the server causes the transition T2 from the state E2 to the state E3.

The state E3 corresponds to the state which the interactive service is in subsequent to the selection of the choice "Service 1". This is for example a state in which the server consults the database DB so as to provide the user with a state of his telephone consumptions.

The receipt of a message corresponding to the choice "Service 2" by the server causes the transition T3 from the state E2 to the state E4.

The state E4 corresponds to the state which the interactive service is in subsequent to the selection of the choice "Service 2".

Thus, the service logic of an interactive server can be described by a VoiceXML document and implemented by a finite automaton whose transitions between states can be commanded by the receipt of particular messages.

FIG. 3 illustrates the main steps of the method for establishing a second communication which are carried out by the server SI according to a particular embodiment. FIG. 4 illustrates for its part the various steps of the toggling method which are carried out by the terminal TA according to a particular embodiment.

In step 400, the terminal TA transmits a communication establishment message destined for the interactive server SI. For example, the terminal sends an SIP INVITE message to request the establishment of a voice communication with the server SI.

The server receives the communication establishment request in step 300 and accepts the communication.

A voice communication is then established between the terminal TA and the server SI.

The server initializes an automaton on the basis of a description document for the service such as the VoiceXML document annexed hereto. It is understood that this VoiceXML document is given purely by way of illustration and that the invention applies to any type of interactive service adhering to various more or less complex modes of logic, and that these various modes of service logic can be described or configured in the server on the basis of descriptive supports other than VoiceXML, such as for example on the basis of a dedicated computer program.

In accordance with the automaton described with reference to FIG. 2, the server SI is in the state E1 represented in FIG. 2 subsequent to the establishment of the voice communication. It then transmits an announcement phrase to the terminal, inviting the user of the terminal TA to provide a client number. This announcement is for example transmitted through the first communication in the form of a compressed speech signal. The speech signal may have been synthesized on the basis of the content of a <prompt> tag of the VoiceXML file or recorded beforehand.

The terminal TA receives the announcement message and renders it to the user. In response to this invitation to provide a client number, the user enters for example the digits of the number requested on the keyboard of the terminal TA. The digits are encoded in DTMF form and transmitted to the server by way of the first communication established. As a variant, the server SI can implement a speech recognition algorithm and allow the user to simply speak the requested digits.

The server can verify that the digits received do indeed correspond to the data expected on the basis of the grammar designated in the VoiceXML document. The receipt by the server SI of a valid client number originating from the terminal causes a transition from the state E1 to the state E2 in which the server is on standby awaiting a choice from the user as regards the service which he wishes to access.

The user of the terminal TA, for example for confidentiality reasons, no longer wishes to interact vocally with the service offered by the server SI.

The terminal then transmits, in step 401, a toggling command aimed at establishing a second communication according to a second modality. For example, subsequent to an action of the user, the terminal transmits a command aimed at establishing a second communication according to a text modality, complying with an instant messaging protocol such as RCS. Such a command can correspond to a particular DTMF signal or a spoken key word transmitted in the audio channel of the first communication.

The server obtains the command for establishing a second communication according to a second modality in step 301.

According to a particular embodiment, the toggling is on the initiative of the server. The server does not receive any toggling command originating from the terminal, but determines that the establishment of a second communication according to a second modality is necessary. For example the server can determine that a particular datum must not be transmitted according to a voice modality for confidentiality reasons. The client number requested when the server is in the state E1 may for example be a confidential item of information that must not be heard by people situated in proximity to the user. The server can then decide to establish a second communication according to a text modality so that the user can input the client number without being heard, in complete confidentiality.

On receipt of such a command, the server stores in step 302 a context representative of the interactions that have taken place between the terminal and the interactive server in the course of the first communication in association with an identifier of the terminal, the context comprising at least one state occupied by the interactive server in the course of the first communication.

The stored context comprises in particular the data provided by the terminal since the establishment of the communication, such as for example the client number transmitted by the terminal. The context also comprises the current state of the automaton governing the service logic of the interactive server.

In this instance, the context comprises an item of information according to which the automaton is in the state E2, the telephone number associated with the terminal TA and the client number provided by the terminal.

According to a particular embodiment, the stored context comprises at least a history of the states successively occupied by the interactive server in the course of the first communication and a history of the transitions that led to these states. For example, when the storage step occurs whilst the automaton is in the state E3, the stored context can comprise the states E1, E2 and E3, the events which caused the transitions from one state to another, as well as the data input by the user in the course of the communication.

In step 304, the server establishes a second communication with the terminal according to a second modality, on the basis of the stored public identity. Accordingly, the server SI dispatches an SIP INVITE message destined for the terminal. The public identity stored with the context makes it possible to fill in the message recipient field. The capabilities indicated in the session establishment message comprise the indications necessary for establishing a communication according to the second desired modality. For example, the SIP INVITE message comprises an SDP (Session Description Protocol) part in which it declares ability to establish communications complying with the RCS standard. The capabilities declared in the SDP message do not comprise any capabilities making it possible to establish a communication according to the first modality. For example, if the first modality is voice, the SDP message does not contain any voice capabilities. Thus, a voice communication cannot be established. In this way, the method makes it possible to prevent the second communication from being established according to a modality similar to the modality of the first communication.

The terminal receives the request for establishment of a second communication according to a second modality in step 403 and accepts the communication by responding with an SIP 200 OK message.

When the second communication according to the second modality is established, the server configures the second communication on the basis of the context stored in step 305. In this way the messages received via the second communication can cause transitions and changes of state in the automaton of the interactive server SI. The user can thus interact with the interactive server by using either of the communications. Moreover, the state which the automaton is in at the moment of the establishment of the second communication is preserved, as are the data already filled in by the user.

According to a particular embodiment, the configuring step comprises a step of transmitting to the terminal, via the second communication and in a form adapted to suit the second modality, at least a part of the stored context.

Accordingly, the server SI can generate a text message representative of the state of the interactive service at the moment of the establishment of the second communication. For example, such a message can be generated on the basis of the <prompt> and <choice> tags of the VoiceXML file corresponding to the state E2 of the interactive service to remind the user of the datum expected by the server, and can be transmitted to the terminal TA via an instant message sent through the second communication. According to a particular embodiment, the data already communicated by the server in the course of the voice communication, or a summary of these data, can be transmitted to the terminal in the form of a text message. Such an arrangement allows the user of the terminal to know the context of the communication and the data expected by the server. Again according to a particular embodiment, the data already communicated by the terminal in the course of the voice communication are retransmitted in the form of an instant message received by the terminal TA.

In the context of the present disclosure, the configuration message sent by the server SI upon the establishment of the second communication can be the following: "You have sent us the following client number: 0123456789. Which service do you wish to access? "Service 1" or "Service 2"?".

According to a particular embodiment, the configuring step is at least in part carried out during the phase of establishment of the second communication. Specifically, a part of the context information can be presented to the user during the phase of presentation of the second communication on the second terminal. Accordingly, the context information transmitted can be included in an SIP INVITE message of establishment of the second communication and can be presented to the user by the terminal so that the latter can decide whether to accept the communication. According to a particular embodiment, a part of the context item of information is included in the "from" field of the INVITE message, and in particular, in the "Display Name" part of the "from" field. The content of the "Display Name" field is generally displayed by the terminal when the call is presented to the user. Thus, the context is displayed on the screen of the terminal in place of the identifier of the caller during the presentation of the call, and the user is informed of the context before accepting the communication The terminal TA receives such a message in step 404 and renders it in a suitable communication interface in step 405. When the message is an audio signal, it is rendered by a loudspeaker of the terminal. When it is a text message, it is rendered in a suitable communication interface, such as for example an instant messaging interface.

According to a particular embodiment, the establishing method comprises a step of adapting the context transmitted to the terminal according to the modality of the second communication. For example, an indication inviting the user to type in the desired command can be added when the second communication modality is a text modality.

According to a particular embodiment, the establishing method comprises a step 303 in the course of which the server SI obtains the communication capabilities of the terminal TA. The capabilities of the terminal TA are received in a compliant format in a section of the message complying with the SDP standard (IETF RFC4566—SDP Session Description Protocol). The server can obtain the capabilities of the terminal in response to an SIP OPTIONS message dispatched to terminal. In response to such a message, the server receives the set of capabilities of the terminal TA in an SIP 200 OK message. As a variant, the server can obtain the capabilities of the terminal TA in the SIP INVITE message of establishment of the first communication. The communication capabilities comprise for example coding formats supported or communication modalities.

In a corresponding way, the toggling method comprises, according to a particular embodiment, a step 401 of transmitting its communication capabilities to the server SI. The capabilities of the terminal correspond to the coding formats and to the communication protocols supported for example. These capabilities can be transmitted by the terminal in compliance with the SDP standard, for example in an SIP INVITE session initiation message, in a response to an SIP INVITE message, or in response to an SIP OPTIONS request.

According to a particular embodiment, the public identity stored in association with the context during step 302 is an identifier of a telephone line shared between a plurality of terminals of a user. Thus, the second communication can be established on a terminal distinct from the first terminal, thereby allowing a user to continue an interaction begun with the telephone from a tablet, without losing the context thereof.

According to a particular embodiment, the first communication is disconnected when the second communication is established. In this way, a single modality at a time is available. Accordingly, the server SI sends an end-of-communication message destined for the terminal TA, such as for example an SIP BYE message. The first communication is thus terminated and the associated resources are released.

According to a particular embodiment, the first and the second communication remain established simultaneously. Thus, the user of the terminal TA can at any moment use one or the other of the modalities to interact with the interactive server SI. Accordingly, neither the terminal TA nor the server SI transmit an end-of-communication message and the first communication is not released.

According to a particular embodiment, the first and the second communication remain established simultaneously and the messages sent by the server are transmitted to the terminal in the first and the second communication. Thus, when the server SI transmits a message to the terminal TA, for example a message inviting the user to make a choice, it is transmitted in a voice form via the first communication and in text form via the second communication. Likewise, when the user transmits a command to the interactive server through for example the voice communication and this command causes a state transition of the interactive service, a message representative of the command that brought about the transition is transmitted via the second communication. Thus, at any moment the user has at his disposal on the text communication interface a history of the commands transmitted via the voice communication. Conversely, commands transmitted via a text communication can be synthesized vocally by the server and transmitted to the terminal in the voice communication.

Accordingly, the server can implement a conversion or adaptation module configured to receive the commands originating from the terminal via a first communication, and when the command causes a state transition or when it comprises a particular datum transmitted to the server by the terminal, to retransmit it to the terminal through a second communication in a form adapted to suit the modality of the second communication.

FIG. 5 illustrates the architecture of a device 500 adapted to implement the establishing method according to a particular embodiment.

The device comprises a storage space 501, for example a memory MEM, a processing unit 502 equipped for example with a processor PROC. The processing unit can be driven by a program 503, for example a computer program PGR, implementing the establishing method according to the various embodiments described in the present document, and notably the steps of obtaining a command for establishing a second communication according to a second modality, of storing a context representative of the interactions that have taken place between the terminal and the interactive server in the course of the first communication in association with a public identity, the context comprising at least one state occupied by the interactive server in the course of the first communication, of establishing a second communication according to a second modality toward a recipient terminal designated by the stored public identity, and of configuring the second communication on the basis of the stored context.

On initialization, the instructions of the computer program 503 are for example loaded into a RAM (Random Access Memory) memory before being executed by the processor of the processing unit 502. The processor of the processing unit 502 implements the steps of the establishing method according to the instructions of the computer program 503.

Accordingly, the device comprises a communication module 504 adapted to establish a first communication with a terminal according to a first modality, such as for example a voice or text communication, and to obtain a command for establishing a second communication according to a second modality. It entails for example a network interface configured to establish communications through an IMS network, an Ethernet, RTC, 2G, 3G or 4G communication interface.

The memory 501 of the device 500 is furthermore adapted to store a context representative of the interactions that have taken place between the terminal and the device in the course of the first communication in association with a public identity, the context comprising at least one state occupied by the device in the course of the first communication. The context data can also be stored in a memory distinct from the memory 501, for example in a database associated with the device and accessible via requests of SQL type for example.

The device also comprises a communication module 506 adapted to establish a second communication according to a second modality with a recipient terminal designated by the stored public identity. It entails for example a network interface configured to establish communications through an IMS network, an Ethernet, RTC, 2G, 3G or 4G communication interface. According to a particular embodiment, the communication interface 504 is combined with the communication interface 506.

Finally, the device comprises a configuration module 505 adapted to configure the second communication on the basis of the stored context. Such a configuration module can be implemented by a processor configured by instructions adapted to transmit data representative of the context stored in the memory 501 to a recipient terminal of the second communication. For example, the module 505 can adapt and transmit a history of the messages exchanged since the beginning of the first communication.

According to a particular embodiment, such a device is integrated into a voice interactive server or a conversational agent (chatbot).

FIG. 6 illustrates the architecture of a device 600 adapted to implement the toggling method according to a particular embodiment.

The device comprises a storage space 601, for example a memory MEM, a processing unit 602 equipped for example with a processor PROC. The processing unit can be driven by a program 603, for example a computer program PGR, implementing the toggling method according to the various embodiments described in the present document, and notably the steps of establishing a first communication with an interactive server according to a first modality, of dispatching to the server a command for toggling to a second communication according to a second modality, of receiving a message of establishment of a second communication between the interactive server and the terminal according to a second modality, of receiving at least one message representative of the interactions that have taken place between the terminal and the interactive server during the first communication and of rendering the representative message received.

On initialization, the instructions of the computer program 603 are for example loaded into a RAM (Random Access Memory) memory before being executed by the processor of the processing unit 602. The processor of the processing unit 602 implements the steps of the toggling method according to the instructions of the computer program 603.

Accordingly, the device comprises a communication module 605 such as for example an Ethernet, RTC, 2G, 3G, 4G or WiFi network interface. The module 605 is in particular adapted to establish a first communication according to a first modality with an interactive server. For example, the module 605 is configured to establish a voice communication with an interactive server according to the SIP protocol, or a communication according to a text modality complying with the RCS standard.

The device also comprises a communication module 604 adapted to transmit destined for the interactive server a command for establishing a second communication according to a second modality and to receive a message of establishment of a second communication between the interactive server and the device according to a second modality. It entails for example Ethernet, RTC, 2G, 3G, 4G or WiFi network interface.

The communication module 604 is furthermore adapted to receive at least one message comprising a context representative of the interactions that have taken place between the device and the interactive server in the course of the first communication. Accordingly, the communication module implements at least one communication protocol, such as the SIP protocol for example.

According to a particular embodiment, the communication modules 604 and 605 correspond to a single network interface.

The device finally comprises a rendering module 606. The rendering module is configured to render the context representative of the interactions that have taken place between the device and the interactive server in the course of the first communication received by the communication module 604. It entails for example a screen associated with a graphical interface adapted to exchange instant messages, or a loudspeaker adapted to decode and render an audio signal received by a communication interface.

According to a particular embodiment, the device is integrated into a communication terminal of smartphone or tablet type, a connected object or a personal computer.

---

ANNEX

---

```
<form id="getClientNumber">
    <field name="ClientNumber">
    <prompt>
        What is your client number?
    </prompt>
    <grammar src="clientNum.grxml" type="application/srgs+xml" />
    <goto next=#selectService > />
    </field>
</form>
<menu id="selectService">
    <field name="SelectService">
    <prompt>
        Which service do you wish to access? <enumerate/>
    </prompt>
    <choice next=s1.vxml">
        <grammar src="s1.grxml" type="application/srgs+xml" />
        Service 1
    </choice>
    <choice next="s2.vxml">
        <grammar src="s2.grxml" type="application/srgs+xml" />
        Service 2
    </choice>
    </field>
</menu>
```

---

The invention claimed is:

1. A method for establishing a second communication according to a second modality on a basis of a first communication established according to a first modality between a communication terminal and an interactive server, the interactive server being adapted to react, according to a predefined logic, to commands received originating from the communication terminal, the logic being predefined by a set of states and by conditions of transitions between said states, the method comprising steps carried out by the server comprising:

obtaining a command for establishing the second communication according to the second modality, storing a context representative of interactions that have taken place between the communication terminal and the interactive server during the first communication and a public identity, the stored context comprising at least a history of the states successively occupied by the interactive server during the first communication, establishing the second communication according to the second modality toward a recipient terminal designated by the stored public identity, and configuring the second communication by transmitting to the recipient terminal, via the second communication and in a form adapted to suit the second modality, at least a part of the stored context.

2. The method as claimed in claim 1, in which the stored context further comprises a history of the transitions that led to the states of the history of the states.

3. The method as claimed in claim 1, in which the first communication is established according to a voice modality, the second communication being established according to a text modality.

4. The method as claimed in claim 1, in which the first communication is established according to a text modality, the second communication being established according to a voice modality.

5. The method as claimed in claim 1, comprising an act of checking that a communication according to the second modality is possible between the server and the recipient terminal.

6. The method as claimed in claim 1, in which the first communication is maintained subsequent to the establishment of the second communication, the messages sent by the server being transmitted via the first and the second communication.

7. The method as claimed in claim 1, in which the second communication is established with a recipient terminal distinct from the communication terminal with which the first communication is established.

8. A method for toggling a second communication according to a second modality on a basis of a first communication established according to a first modality between a communication terminal and an interactive server, the interactive server being adapted to react to commands sent by the communication terminal according to a predefined logic, the predefined logic being predefined by a set of states and by conditions of transitions between said states, the method comprising steps carried out by the communication terminal comprising:

dispatching to the server of a command for toggling to the second communication according to the second modality, receiving a message of establishment of the second communication between the interactive server and the communication terminal according to the second modality, receiving at least a part of a stored context comprising at least a history of the states successively occupied by the interactive server during the first communication with the communication terminal, and rendering via the second communication and in a form adapted to suit the second modality, at least a part of the stored context received.

9. A device for establishing a second communication according to a second modality on a basis of a first communication established according to a first modality between a communication terminal and the device, the device being adapted to react, according to a predefined logic, to commands received originating from the communication terminal, the logic being predefined by a set of states and by conditions of transitions between said states, wherein the device comprises:
- a communication module adapted to obtain a command for establishing the second communication according to the second modality,
- a memory adapted to store a context representative of interactions that have taken place between the communication terminal and the device during the first communication and a public identity, the stored context comprising at least a history of the states successively occupied by the interactive server during the first communication,
- a communication module adapted to establish the second communication according to the second modality with a recipient terminal designated by the stored public identity, and
- a configuration module adapted to configure the second communication by transmitting to the recipient terminal, via the second communication and in a form adapted to suit the second modality, at least a part of the stored context.

10. The device according to claim 9, wherein the device is implemented in an interactive server.

11. A communication terminal capable of toggling between a first communication established according to a first modality with an interactive server and a second communication established according to a second modality with the interactive server, the interactive server being adapted to react according to a predefined logic to commands sent by the communication terminal, the predefined logic being predefined by a set of states and by conditions of transitions between said states, the communication terminal comprising:
- a communication module adapted to transmit destined for the interactive server a command for establishing the second communication according to the second modality,
- the communication module also being adapted to receive a message of establishment of the second communication between the interactive server and the communication terminal according to the second modality,
- the communication module furthermore being adapted to receive at least a part of a stored context comprising at least a history of the states successively occupied by the interactive server during the first communication with the communication terminal, and
- a rendering module adapted to render via the second communication and in a form adapted to suit the second modality, at least a part of the stored context received.

12. A non-transitory information medium readable by a processor on which is recorded a computer program comprising instructions for executing a method of establishing a second communication according to a second modality on a basis of a first communication established according to a first modality between a communication terminal and an interactive server, when the instructions are executed by a processor of the interactive server, the interactive server being adapted to react, according to a predefined logic, to commands received originating from the communication terminal, the logic being predefined by a set of states and by conditions of transitions between said states, wherein the instructions configure the interactive server to perform steps comprising:
- obtaining a command for establishing the second communication according to the second modality,
- storing a context representative of interactions that have taken place between the communication terminal and the interactive server during the first communication and a public identity, the stored context comprising at least a history of the states successively occupied by the interactive server during the first communication,
- establishing the second communication according to the second modality toward a recipient terminal designated by the stored public identity, and
- configuring the second communication by transmitting to the recipient terminal, via the second communication and in a form adapted to suit the second modality, at least a part of the stored context.

13. A non-transitory information medium readable by a processor on which is recorded a computer program comprising instructions for executing a method of toggling a second communication according to a second modality on a basis of a first communication established according to a first modality between a communication terminal and an interactive server, when the instructions are executed by a processor of the communication terminal, the interactive server being adapted to react to commands sent by the communication terminal according to a predefined logic, the predefined logic being predefined by a set of states and by conditions of transitions between said states wherein the instructions configure the communication terminal to perform steps comprising:
- dispatching to the server of a command for toggling to the second communication according to the second modality,
- receiving a message of establishment of the second communication between the interactive server and the communication terminal according to the second modality,
- receiving at least a part of a stored context comprising at least a history of the states successively occupied by the interactive server during the first communication with the communication terminal, and
- rendering via the second communication and in a form adapted to suit the second modality, at least a part of the stored context received.

\* \* \* \* \*